United States Patent [19]
Bassett

[11] Patent Number: 5,346,020
[45] Date of Patent: Sep. 13, 1994

[54] FORGED CLEARING WHEEL FOR AGRICULTURAL RESIDUE

[76] Inventor: James H. Bassett, c/o Dawn Equipment Co., 1210 E. State St., Sycamore, Ill. 60178

[21] Appl. No.: 925,371

[22] Filed: Aug. 4, 1992

[51] Int. Cl.⁵ ............................................. A01B 21/02
[52] U.S. Cl. ................................. 172/540; 172/555; 172/604; 29/891
[58] Field of Search ................. 172/604, 540, 555; 111/139, 140; 29/891; 76/115, 112, 116, 101.1; 72/377, 379.2, 336

[56] References Cited

U.S. PATENT DOCUMENTS

| | | | |
|---|---|---|---|
| 2,269,051 | 1/1942 | Cahoy | 172/555 |
| 2,773,343 | 12/1956 | Oppel | 172/555 |
| 3,213,514 | 10/1965 | Evans | 29/891 |
| 3,250,109 | 5/1966 | Spyridakis | 72/377 |
| 3,314,278 | 4/1967 | Bergman | 72/377 |
| 3,355,930 | 12/1967 | Fedorov | 72/377 |
| 3,370,450 | 2/1968 | Scheucher | 72/377 |
| 3,576,098 | 4/1971 | Brewer | 56/295 |
| 3,766,988 | 10/1973 | Whitesides | 172/555 |
| 4,058,171 | 11/1977 | van der Lely | 172/713 |
| 4,096,730 | 6/1978 | Martin | 72/377 |
| 4,099,576 | 7/1978 | Jilani | 172/555 |
| 4,317,355 | 3/1982 | Hatsuno et al. | 72/377 |
| 4,433,568 | 2/1984 | Kondo | 72/377 |
| 4,538,688 | 9/1985 | Szucs et al. | 172/555 |

Primary Examiner—Clifford D. Crowder
Assistant Examiner—Michael A. Neas
Attorney, Agent, or Firm—Wood, Phillips, VanSanten, Hoffman & Ertel

[57] ABSTRACT

A clearing wheel for agricultural residue. The wheel has a hub defining a central axis, about which the cleaning wheel can be rotated in use, and a plurality of cutting teeth projecting radially outwardly from the hub to intercept and resituate residue upon the clearing wheel's being rotated about its central axis. At least a first and second of the teeth have an internal grain pattern running in first and second transverse directions. The invention is also directed to a method of making a clearing wheel by a forging process.

24 Claims, 2 Drawing Sheets

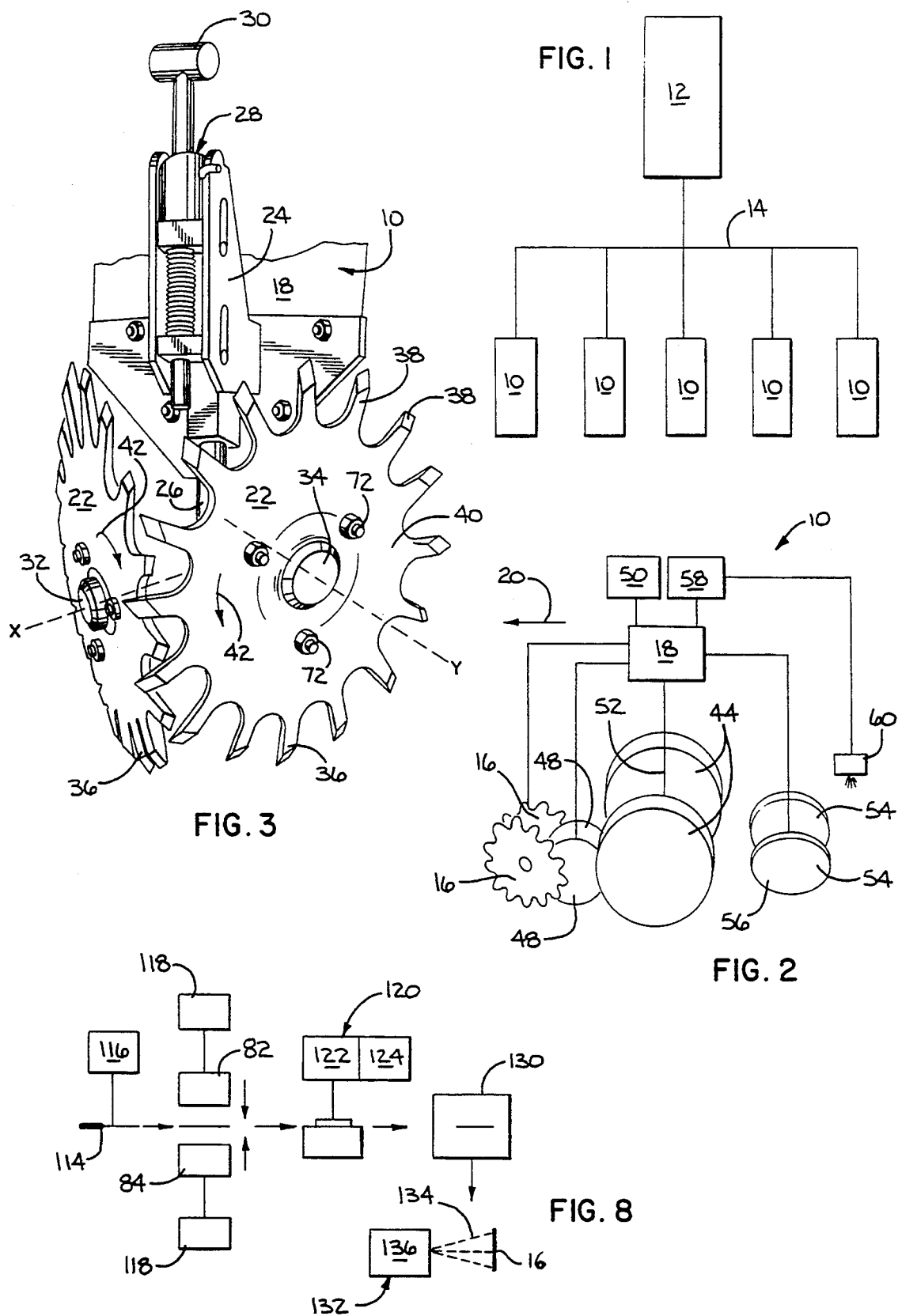

FORGED CLEARING WHEEL FOR AGRICULTURAL RESIDUE

BACKGROUND OF THE INVENTION

Field of the Invention

This invention relates to farm implements and, more particularly, to a mechanism which can be mounted on a planter, or the like, to continuously a) resituate agricultural residue in a planting row and b) till and aerate the soil in the planting row upstream of where the planter separates the soil to accept seed.

Background Art

There are many planting techniques currently practiced by farmers. By conventional methods, planting of a field is carried out in steps. First, the entire field is worked to break up the soil, break loose the residue from the preceding year's crops, and break down and work the residue into the tilled soil. The planting rows from the prior year are eliminated so that the entire field has a substantially homogeneous soil texture.

This conventional technique has numerous drawbacks. First of all, this technique requires the performance of multiple steps to effect planting of a field. The field is first cultivated during one or more passes of a cultivator over the field. A separate planter attachment is then utilized to deposit seed and spray fertilizer in an entirely separate operation. To carry out the different operations, the user is required to connect and disconnect equipment to and from the drawing vehicle.

A further problem with this conventional technique is that the residue, such as corn stalks, may not be effectively pulverized, even though several passes have been made over the field with the cultivator unit. The result is that the residue may jam up in the planter unit and/or block the placement of the seed and spraying of fertilizer.

A further problem with this conventional technique is that cultivation of the entire field increases soil erosion. Not only is this undesirable from the standpoint of loosing fertile soil, but of late the federal government has decided to impose restrictions on erosion by requiring that a certain amount of ground cover remain in place in the field.

Certain of these problems led to the development of residue clearing devices which facilitate the planting of seed without prior cultivation. John Deere, for one, has been active in the development of residue clearing devices. One such structure currently used by John Deere has a cooperating pair of rotary wheels. The wheels are constructed from flat steel plate material and have a central hub with radially projecting teeth spaced equidistantly about the periphery of the hub. The wheel pair is mounted on a planter frame so that the teeth are in mesh, with the wheels toed in at their bottoms and diverging away from each other in a trailing direction. The angular relationship of the wheels results in their rotation as they engage with and are dragged across the field in operation.

The wheels are oriented so that they resituate residue in the planting row upstream of the mechanism which parts the soil, deposits the seed, and replaces the soil around the planted seed. Thus, the cultivation and planting can be effected in one pass over the field, even where there are unchopped cornstalks, soybeans, standing wheat, etc. These wheels have proven to be highly valuable in recently developed no-till, min-till and ridge-till operations, as well as in conventional tilling operations.

There are many demands placed on the above wheels. First of all, the field conditions may be extremely harsh. For example, foreign objects, such as rocks, and the like, may be encountered during use. The wheels must be able to withstand breakage as upon impact with such objects and when such objects migrate between the meshing wheels.

Typically, the wheels are mounted in tandem with often in excess of a dozen such pairs being simultaneously drawn through a field by a single vehicle. Consequently, affordability, as well as durability, is an important consideration in the design of such wheels.

Heretofore, it has been common to form such wheels from a metal plate that has a uniform thickness. This metal plate material, when formed by rolling, typically has an internal grain pattern that extends in a single direction. Certain of the cutting teeth are lined up with the grain pattern so that they have good resistance to shearing. However, a number of the teeth may have a grain pattern that runs at 90° to the length of the teeth. These teeth are prone to shearing under the severe conditions encountered in the agricultural environment.

Another problem with conventional wheels is that they are normally constructed by a method that is both time consuming and expensive. Typically, the teeth are individually laser or flame cut from metal stock from between $\frac{1}{4}$–154 inch. Then, in a separate operation, the free ends of the teeth are beveled on one side, as by grinding. The wheels, which have a uniform thickness, on other than the bevel, have a tendency to stick, particularly in damp soil, which may result in the soil's pulling up in relatively large clumps.

One manufacturer, in order to minimize manufacturing costs, manufactured the wheels with $\frac{1}{4}$ inch stock without any bevel on the teeth. However, it was found that this wheel did not effectively penetrate the soil easily. Further, the thinner plate material is prone to failure.

SUMMARY OF THE INVENTION

The present invention is specifically directed to overcoming the above-enumerated problems in a novel and simple manner.

According to the invention, a clearing wheel is provided for agricultural residue. The wheel has a hub defining a central axis, about which the cleaning wheel can be rotated in use, and a plurality of cutting teeth projecting radially outwardly from the hub to intercept and resituate residue upon the clearing wheel being rotated about its central axis. At least a first and second of the teeth have an internal grain pattern running in first and second transverse directions.

By controlling the internal grain pattern for the wheel, the resistance to shear for the teeth can be improved.

To maximize resistance to shear, the grain pattern is preferably controlled so that it runs substantially radially through several, if not all, of the teeth.

In a preferred form, the grain pattern is controlled by making the wheel by a forging process. During the forging process, the internal grain pattern is reoriented to align radially outwardly through all the teeth from the central axis.

Not only does the forging process enhance the strength of the teeth, but it also facilitates manufacture.

In one form of the invention, the teeth have a bevel on at least one side thereof. The bevel can be formed simultaneously on all the teeth through the forgoing process. This obviates the need to individually grind the teeth, as is conventional.

To enhance penetration by, and facilitate withdrawal of, the wheel, the hub and the teeth can be tapered to diminish in thickness away from the central axis of the hub. This taper can be formed by selecting an appropriate die during the forging process.

To further enhance soil penetration by the wheel, the free ends of the teeth can be beveled on both axially oppositely facing sides of the wheel.

In one form, the hub has a thickness of approximately, 0.56 inch adjacent the central axis thereof. The hub tapers by at least 0.18 inch radially outwardly from the central axis of the hub.

The hub can be provided with a central opening as to accommodate a hub, to facilitate mounting of the wheel on a support to be drawn by the towing vehicle.

The invention further contemplates a wheel having a hub defining a central axis about which the wheel can be rotated in use, and a plurality of cutting teeth projecting radially outwardly from the hub, wherein the hub has a non-uniform thickness.

In a preferred form, the clearing wheel has a one-piece construction.

The invention further contemplates a method of manufacturing a clearing wheel, including the steps of providing a predetermined amount of metal material, and forging the material to define a hub with a central axis about which the clearing wheel can be rotated, and a plurality of cutting teeth projecting radially outwardly from the hub.

In one form, a taper is formed in the hub during forging. Bevels can also be formed in the teeth during the forging step.

The invention also contemplates the step of boring out at least one hole in the hub to facilitate mounting of the clearing wheel on a support therefor.

The invention further contemplates the step of heat treating the clearing wheel after the forgoing step.

After the heat treating step, foreign matter, such as scale, is removed from the wheel, as by propelling shot against the wheel.

BRIEF DESCRIPTION OF THE DRAWINGS

FIG. 1 is a schematic plan view showing a towing vehicle, carrying therebehind in a trailing direction a plurality of planter assemblies, with which the inventive clearing wheel for agricultural residue can be provided;

FIG. 2 is a schematic representation of one of the planter assemblies with a pair of the inventive clearing wheels operatively mounted thereon;

FIG. 3 is an isolated perspective view of conventional clearing wheels in operative position on a planter assembly;

FIG. 8 is a schematic representation of a system for forging a clearing wheel according to the present invention.

DETAILED DESCRIPTION OF THE DRAWINGS

Figure 4:
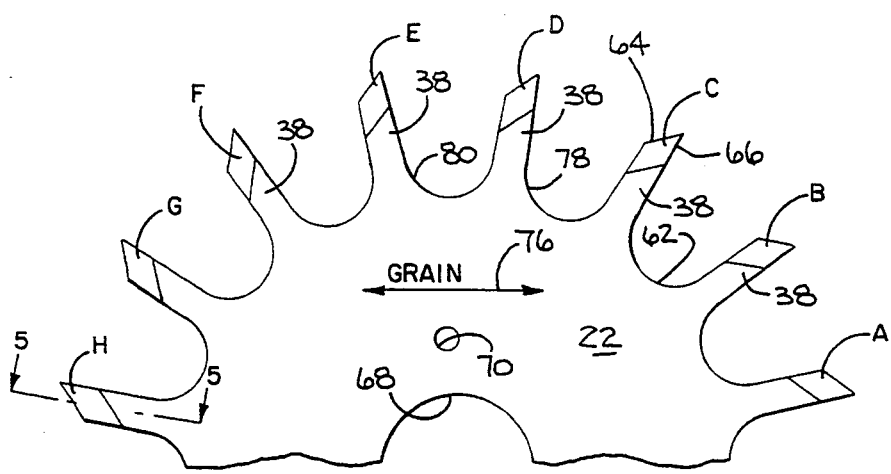
FIG. 4 is a fragmentary side elevation view of one of the wheels in FIG. 3.

A planter assembly, with which the present invention can be associated, is shown schematically at 10 in FIG. 2. Typically, a plurality of planter assemblies, such as that 10 shown in FIG. 2, are towed behind a drawing vehicle 12, as shown schematically in FIG. 1. The drawing vehicle 12 tows a frame 14, which maintains the planter assemblies 10 in laterally spaced relationship, with the spacing between the planter assemblies being the same as the spacing between adjacent planting rows.

Figure 6:
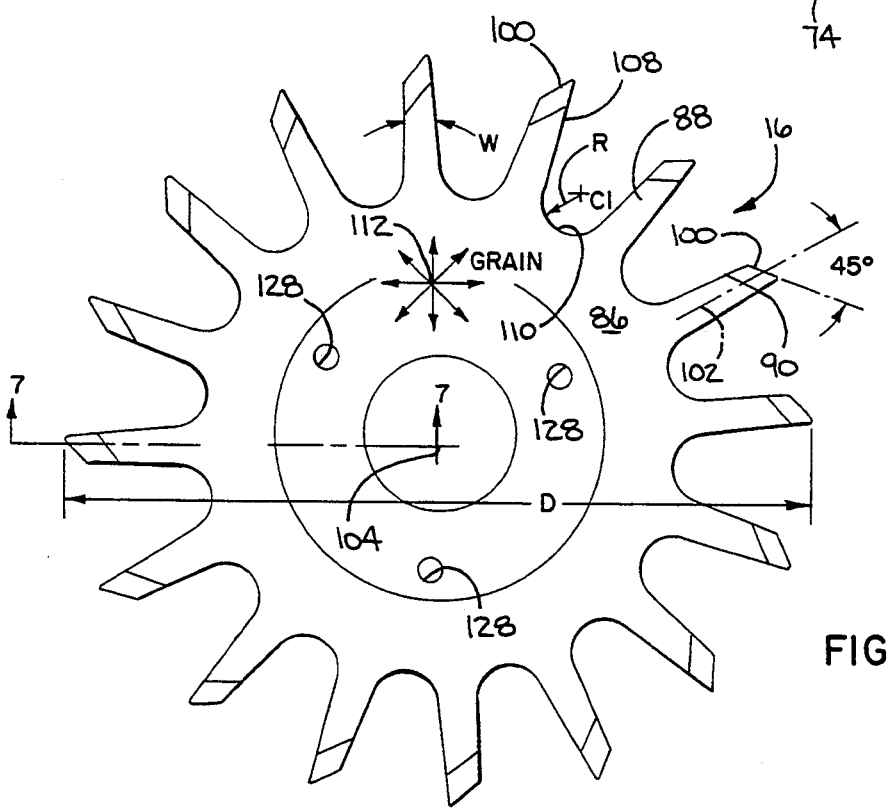
FIG. 6 is a side elevation view of the inventive clearing wheel.
Figure 7:
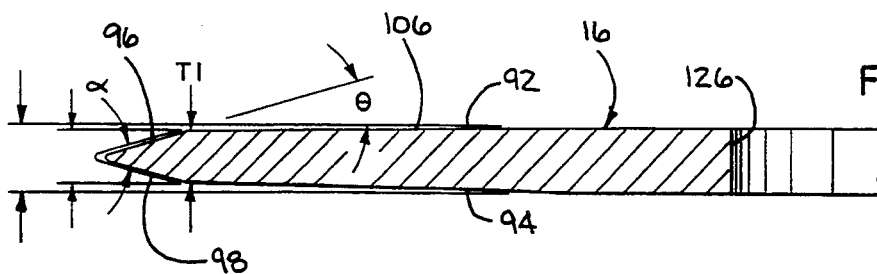
FIG. 7 is an enlarged cross-sectional view of the inventive clearing wheel taken along line 7—7 of FIG. 6.

While the planter assemblies 10 do not constitute a part of the invention, it is useful to understand the operation of a typical planter assembly 10 to set out one environment for use of the inventive clearing wheel 16, as shown in FIGS. 2, 6 and 7.

The planter assembly 10 has a frame 18 which is advanced by the drawing vehicle 12 in the direction of the arrow 20 in FIG. 2. The wheels 16 are mounted in tandem at the forward portion of the frame 18. The mounting structure therefor can be seen most clearly in FIG. 3. The wheels 22 shown in FIG. 3 are of a conventional construction, but mounted in the same manner as are the inventive wheels 16.

More particularly, the frame 18 of the planter assembly 10 carries a mounting bracket 24. The mounting bracket 24 is the subject of a separate application in the name of James H. Bassett and Robert E. Boyle, Jr. and directed to an invention identified as "Mechanism for Selectively Repositioning a Farm Implement", U.S. patent application Ser. No. 735,298. Generally, the bracket 24 has a connector 26 that is movable vertically selectively upwardly and downwardly by a mechanism 28, that is operable through a graspable handle 30. Vertical movement of the connector 26 effects a corresponding vertical movement of the wheels 22.

The wheels 22 are mounted on hubs 32, 34 that support the wheels for rotation about non-parallel axes X, Y. The hubs 32, 34 are oriented so that the bottom portions 36 of the wheels 22 are toed inwardly and so that the wheels diverge away from each other in a trailing direction. This results in the wheel's being self rotating as they are advanced through the underlying soil. Each wheel 22 has a plurality of radially projecting teeth 38 spaced equidistantly about a central hub 40. The teeth 38 rotate in operation in the direction of arrows 42 in such a fashion that the teeth 38 on the separate wheels 22 mesh with each other to produce a scissors action that mulches residue that may be picked up by the teeth 38 during operation. At the same time, this scissors action tends to mulch the soil in the seed row, which is centered between the teeth.

The inventive wheels 16 have a diameter on the order of 14 inches. When mounted as FIG. 3, the wheels 16 throw to the opposite sides of the seed row the residue that is picked up, and till and aerate the soil in approximately a 4-6 inch path. Typically, the wheels are adjusted to till to a 1½ inch depth. The residue picked up by the wheels 16 is deposited between adjacent rows and provides a ground cover. The loosened soil provides a good environment for seed growth. The loosened soil tends to be warmed quickly to result in rapid seed emergence.

At the same time, the residue is cleared by the wheels 16 in the path of laterally spaced gauge wheels 44, which are mounted to the frame 18 and maintain a consistent height for the wheels 16 and thus produce a uniform tilling depth for consistent seed growth.

Between the wheels 16 and the gauge wheels 44, Vee opener wheels/plates 48 are provided to part the soil in the row cleared by the inventive wheels 16 and thereby define a seed slot. Downstream of the Vee opener wheels 48, seed from a bin 50 is delivered through a tube 52 into the seed slot opened by the wheels 48.

Downstream of the gauge wheel 44 are a pair of cooperating press wheels 54, which are toed inwardly at their bottom portions 56. The press wheels 54 gently deposit the soil over the planted seeds and thereby close the seed slot created by the Vee opener wheels 40.

Fertilizer from a bin 58 on the frame 18 is then distributed through a nozzle 60 on top of the cleared seed row behind the press wheels 54.

Figure 5:
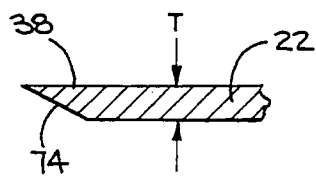
FIG. 5 is a cross-sectional view of the prior art wheel taken along line 5—5 of FIG. 4.

The prior art wheels 22 are shown in detail in FIGS. 3–5. The wheel construction shown is currently being used by John Deere.

The hub 40 and teeth 38 are made from a single piece of steel plate having a thickness T (FIG. 5), that is approximately ⅜ inch. The U-shaped cut-outs 62 between adjacent teeth and the inclined cutting edges 64 at the free ends 66 of the teeth 38 are formed by either flame or laser cutting. A hub receiving bore 68 is defined centrally of the wheel 22. A plurality of bores 70 around the central bore 68 receive mounting bolts 72 which maintain the wheels 22 on the hubs 32, 34.

A bevel 74 is formed at the free ends 66 of the teeth 38. This bevel produces a wedging action and facilitates entry of the teeth 38 into the soil and any residue thereon. However, because the wheels 22 otherwise have a uniform thickness, they tend to stick in the underlying soil into which they are pressed. This is particularly a problem with damp soil.

The steel plate from which the wheel 22 is formed is commonly rolled or otherwise manufactured so that the internal grain pattern generally extends linearly in one direction as indicated by the double-headed arrow 76. Consequently, the metal grain runs radially and substantially in longitudinal alignment with the length of the teeth A, H in FIG. 4. The teeth A, H thus have good resistance to shearing, which would have to occur transversely to the grain pattern. The teeth B, C, F, G have less resistance to shearing given that the grain pattern is directed angularly with respect to the length thereof. The teeth D, E have a grain pattern that runs substantially at right angles to the length thereof. Consequently, these teeth D, E are prone to severing at the roots 78, 80 at the juncture between the hub 40 and teeth 38.

The construction of the inventive wheel 16 overcomes the above problems. The inventive wheel 16 is made preferably by a forging process. A die set 82, 84 (FIG. 8) is selected so that the forging operation forms the hub 86 and the teeth 88 into the final configuration shown in FIGS. 6 and 7.

The wheel 16 has an outer diameter D of approximately 14 inches. Sixteen teeth 88 project away from the hub, are of equal length, and are spaced equidistantly around the periphery of the hub 86. The center of the hub has a thickness of approximately 0.5 inch and more preferably has a thickness greater than 0.5 inch, as for example, 0.58 inch.

The free ends 90 of the teeth 88 are beveled on both sides 92, 94 of the wheel 16. A bevel angle e is defined on each side 92, 94 so that the bevelled surfaces 96, 98 have an included angle e of approximately 40°. The cutting edges 100 of the teeth 88 are inclined at an angle 45° with respect to a radial line 102 extending through the central axis 104 of the wheel and bisecting the teeth 88. The inclined cutting edge 100 and beveled surfaces 96, 98 progressively wedge the soil/residue apart as the wheel is rotated in operation to minimize binding and hangup of moist soil on the wheels 16.

To further enhance the ability of the wheel 16 to penetrate soil and residue, the outer portion 106 of the hub 86 is tapered, as are the tooth portions between the hub 86 and bevel surfaces 96, 98. The teeth 88 are tapered to a thickness T1 in FIG. 7 that is approximately equal to 0.38 inches.

A preferred configuration for the cut-outs 108, between adjacent teeth 88, is shown in FIG. 6. Each cut-out 108 has a bottom portion 110 defined by a circular arc centered on a point C1, that is located 10 inches from the wheel center 104. The radius R of curvature for the surface 110 is 0.63 inches. The teeth have a width W of approximately 0.5 inches. The wheels 16 are preferably symmetrical about a plane extending through the wheels 16 and a right angle to the axis 104.

One important aspect of the present invention is the control of the internal grain pattern within the wheel 16. By forming the wheel 16 by a forging process, as described below, the normal grain pattern is changed so that it is directed substantially radially through each of the teeth 88, as shown schematically by the arrows 112 in FIG. 6. The invention contemplates any process for making the wheel 16, wherein the grain pattern is varied to cause the grain to align with the length of two transverse teeth. The forging process is preferred for its simplicity. Resultingly, the cost of producing the wheel 16 is relatively small. The forged wheel 16 realizes many of the advantages of a cast wheel, which does not have the strength to be suitable for use in the demanding agricultural environment.

The method of forming the wheels 16 by a forging process is shown schematically in FIG. 8. The forging process starts with a predetermined amount of metal stock. More particularly a hot rolled bar of C1541 chemistry modified material is utilized. The material is carbon and manganese controlled and vanadium grain refined to optimize the mechanical properties for the agricultural environment. In a preferred form, the bar dimension is 2.812 inches in diameter. The bar is cut to approximately a six inch length. Generally, the cross section and length are chosen to minimize waste. The metal bar 114 is heated to 2300° F. by induction coils 116. The heated bar 114 is then placed in the die set 82, 84. An 8,000 pound hammer assembly 118 is used to compress the die set 82, 84 in a two step process. In a first step, a blocker operation, the bar 114 is flattened. A finish compression step then forges the bar 114 into the final configuration for the wheel 16 as shown in FIGS. 6 and 7. At a station 120, a mechanism 122 trims away any excess material. A punch assembly 124 then cleans out any residue from the forging process that may be present in a central bore 126 and three mounting bolt bores 128.

The wheel 16 is then quenched and tempered at a station 130 to a Rockwell hardness of 39 to 47.

The hardened wheel 16 is then conveyed to a cleaning station 132. At the station 132 shot 134 is propelled by a mechanism 136 to thereby remove scale and at the same time vary the mechanical properties of the hardened metal to enhance the impact resistance thereof and make it more suitable for the agricultural environment in which rocks, and other hard materials might be encountered.

It has been found that the forged wheel 16, in addition to having superior mechanical properties, can be manufactured at a cost significantly less than the cost of wheels using conventional methods. Whereas conventional methods require the tedious steps of cutting and bevelling the teeth 38, the teeth 88 on the inventive wheel, as well as the hub 86 thereon, can be formed by a single forging step.

The foregoing disclosure of specific embodiments is intended to be illustrative of the broad concepts comprehended by the invention.

I claim:

1. A clearing wheel for agricultural residue, said clearing wheel comprising:
   a hub defining a central axis about which the clearing wheel can be rotated in use; and
   a plurality of cutting teeth projecting radially outwardly from the hub to intercept and resituate residue upon the clearing wheel's being rotated about its central axis,
   there being at least a first and second of said teeth,
   said first tooth having an internal grain pattern running in a first direction,
   said second tooth having an internal grain pattern running in a second direction,
   whereby said first and second directions are transverse to each other,
   said first and second teeth being formed as one piece with at least a portion of the hub.

2. The agricultural residue clearing wheel according to claim 1 wherein each said first and second direction is substantially a radial direction.

3. The agricultural residue clearing wheel according to claim 1 wherein the hub is tapered radially outwardly from said central axis.

4. The agricultural residue clearing wheel according to claim 1 wherein each said cutting tooth has a free end and the free ends of the cutting teeth are bevelled.

5. The agricultural residue clearing wheel according to claim 4 wherein the clearing wheel has first and second oppositely facing sides spaced axially of said central axis and the free ends of the cutting teeth are bevelled on each of the first and second oppositely facing sides of the clearing wheel.

6. The agricultural residue clearing wheel according to claim 1 wherein said hub includes means for mounting the clearing-wheel for rotation relative to a support.

7. The agricultural residue clearing wheel according to claim 1 wherein the clearing wheel is made by a forging process.

8. The agricultural residue clearing wheel according to claim 1 wherein the clearing wheel is made from alloy steel.

9. The agricultural residue clearing wheel according to claim 1 wherein the hub has a thickness of approximately 0.5 inch adjacent to the central axis of the clearing wheel.

10. The agricultural residue clearing wheel according to claim 9 wherein said hub thickness tapers radially away from the central axis of the clearing wheel and the hub thickness diminishes by approximately 0.18 inch between the central axis of the clearing wheel and the teeth.

11. The agricultural residue clearing wheel according to claim 1 wherein the teeth have a radial length, and the first and second teeth having lengths at substantially a right angle to each other.

12. A clearing wheel for agricultural residue, said clearing wheel comprising:
    a hub defining a central axis about which the clearing wheel can be rotated in use; and
    a plurality of cutting teeth projecting radially outwardly from the hub to intercept and resituate residue upon the clearing wheel's being rotated about its central axis,
    there being at least a first and second of said teeth,
    said first tooth having an internal grain pattern running in a first direction,
    said second tooth having an internal grain pattern running in a second direction,
    whereby said first and second directions are transverse to each other,
    wherein said teeth and hub are formed by a forging process,
    said first and second teeth and entire hub being formed as one piece.

13. The agricultural residue clearing wheel according to claim 12 wherein said hub has a non-uniform thickness.

14. The agricultural residue clearing wheel according to claim 12 wherein said cutting teeth have free ends and the cutting teeth are bevelled at the free ends thereof.

15. The agricultural residue clearing wheel according to claim 14 wherein the thickness of the teeth tapers between a point where they project away from the hub and that portion of the teeth that is bevelled.

16. The agricultural residue clearing wheel according to claim 12 wherein the internal grain pattern of the clearing wheel is directed radially through each of the teeth on the clearing wheel.

17. A method of manufacturing a wheel for clearing agricultural residue, said method comprising the steps of:
    providing a predetermined amount of metal material; and
    forging the predetermined amount of metal material to define at least a portion of a hub having a central axis about which the clearing wheel can be rotated in use and a plurality of cutting teeth formed as one piece with the hub portion and projecting radially outwardly from the hub to intercept and resituate residue upon the clearing wheel's being rotated about its central axis,
    said forging step further comprising the step of producing a first grain pattern running in a first direction in a first one of the plurality of cutting teeth and a second grain pattern running in a second direction in a second one of the plurality teeth, with the first and second directions being transverse to each other.

18. The method of manufacturing a clearing wheel according to claim 17 wherein the forging step comprises the step of forming a taper in said hub so that the hub thickness varies radially thereof.

19. The method of manufacturing a clearing wheel according to claim 17 wherein the clearing wheel teeth have free ends and the forging step comprises the step of forming bevels at the free ends of the teeth.

20. The method of manufacturing a clearing wheel according to claim 17 wherein the teeth each have a length and the forging step comprises the step of causing the internal grain pattern in the metal material to be directed lengthwise through each of the teeth.

21. The method of manufacturing a clearing wheel according to claim 17 including the step of heat treating the clearing wheel after the forging step.

22. The method of manufacturing a clearing wheel according to claim 17 including the step of at least partially forming at least one bore in said hub to facilitate mounting of the clearing wheel on a support therefor.

23. The method of manufacturing a clearing wheel according to claim 21 including the step of removing foreign matter developed during at least one of the forging and heat treating steps from the clearing wheel.

24. A method of manufacturing at least a portion of a wheel for clearing agricultural residue, said wheel having a hub defining a central axis about which the clearing wheel can be rotated in use and a plurality of cutting teeth, said method comprising the steps of:

providing a predetermined amount of metal material; and compressing the predetermined amount of metal material to thereby cause the metal material to expand radially in two transverse directions to define first and second elongate cutting teeth that are joined together by and defined as one piece with at least a portion of the hub and have their lengths projecting in said first and second transverse directions.

* * * * *